United States Patent
Centonza et al.

(10) Patent No.: US 9,277,584 B2
(45) Date of Patent: Mar. 1, 2016

(54) CARRIER AGGREGATION SUPPORT FOR HOME BASE STATIONS

(75) Inventors: Angelo Centonza, Winchester (GB); Gunnar Mildh, Sollentuna (SE); Fredrik Gunnarsson, Linköping (SE); Oumer Teyeb, Stockholm (SE); Mojgan Fadaki, Solna (SE); Niklas Johansson, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 675 days.

(21) Appl. No.: 13/318,743

(22) PCT Filed: Nov. 1, 2011

(86) PCT No.: PCT/SE2011/051303
§ 371 (c)(1),
(2), (4) Date: Nov. 3, 2011

(87) PCT Pub. No.: WO2012/166034
PCT Pub. Date: Dec. 6, 2012

(65) Prior Publication Data
US 2012/0309395 A1      Dec. 6, 2012

Related U.S. Application Data

(60) Provisional application No. 61/493,112, filed on Jun. 3, 2011.

(51) Int. Cl.
*H04W 36/00* (2009.01)
*H04M 11/00* (2006.01)
(Continued)

(52) U.S. Cl.
CPC .......... *H04W 84/045* (2013.01); *H04W 92/12* (2013.01); *H04W 92/20* (2013.01)

(58) Field of Classification Search
CPC ..... H04W 36/30; H04W 36/18; H04W 64/00; H04W 4/02
USPC ............... 455/421–422.1, 436, 443–444, 449
See application file for complete search history.

(56) References Cited

U.S. PATENT DOCUMENTS

2009/0109933 A1*  4/2009  Murasawa et al. ............ 370/335
2010/0027508 A1*  2/2010  Jee et al. ...................... 370/331
(Continued)

FOREIGN PATENT DOCUMENTS

EP   2384052 A1   11/2011
WO   2009151258 A2   12/2009
(Continued)

OTHER PUBLICATIONS

Panasonic, "HeNB with carrier aggregation", 3GPP TSG-RAN WG2 Meeting #74, May 9-13, 2011, Barcelona, ES, R2-112805.
(Continued)

*Primary Examiner* — Dung Hong
(74) *Attorney, Agent, or Firm* — Coats & Bennett, PLLC

(57) ABSTRACT

Home base station nodes (110) that support multi-carrier operation are disclosed. In some embodiments, two carrier signals are transmitted on different frequencies to one or more user devices that support multi-carrier operation, and different global cell identifiers are broadcast on the two carrier signals. Control messages are sent and received for both of the two carrier signals over a single control-plane interface between the home base station (110) and either a core network node (170) or a home base station gateway (120).

34 Claims, 4 Drawing Sheets

(51) Int. Cl.
*H04W 4/00* (2009.01)
*H04W 40/00* (2009.01)
*H04B 1/38* (2015.01)
*H04W 84/04* (2009.01)
*H04W 92/12* (2009.01)
*H04W 92/20* (2009.01)

(56) References Cited

U.S. PATENT DOCUMENTS

| | | | |
|---|---|---|---|
| 2010/0297955 A1* | 11/2010 | Marinier et al. | 455/73 |
| 2011/0170496 A1* | 7/2011 | Fong et al. | 370/329 |
| 2011/0269464 A1* | 11/2011 | Xu et al. | 455/436 |
| 2011/0270994 A1* | 11/2011 | Ulupinar et al. | 709/227 |
| 2011/0292911 A1* | 12/2011 | Uemura et al. | 370/331 |

FOREIGN PATENT DOCUMENTS

| | | |
|---|---|---|
| WO | 2010082521 A1 | 7/2010 |
| WO | WO 2010082521 A1 * | 7/2010 |

OTHER PUBLICATIONS

Zte, "Initial consideration on Hetnet mobility enhancements", 3GPP TSG RAN WG2 #73bis, Apr. 11-15, 2011, pp. 1-4, Shanghai, CN, R2-111915.

Itri, "On the simulation results of interference analysis for inbound handover in HeNB", 3GPP TSG RAN WG2 #67, Aug. 24-28, 2009, pp. 1-6, ShenZhen, CN, pp. 1-6, R2-094891.

Ericsson, "No X2 discussion", 3GPP TSG-SA5 (Telecom Management) Meeting SA5#60, Jul. 7-11, 2008, Sophia-Antipolis, FR, S5-081112.

* cited by examiner

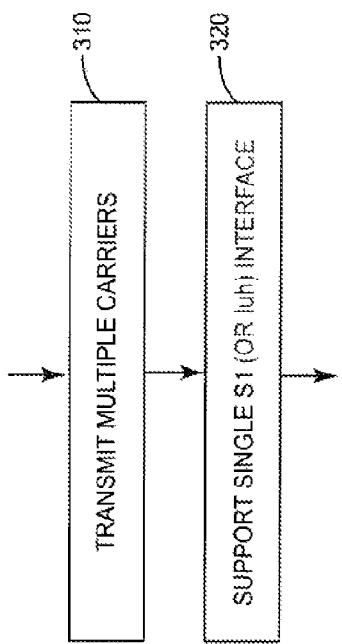
FIG. 3
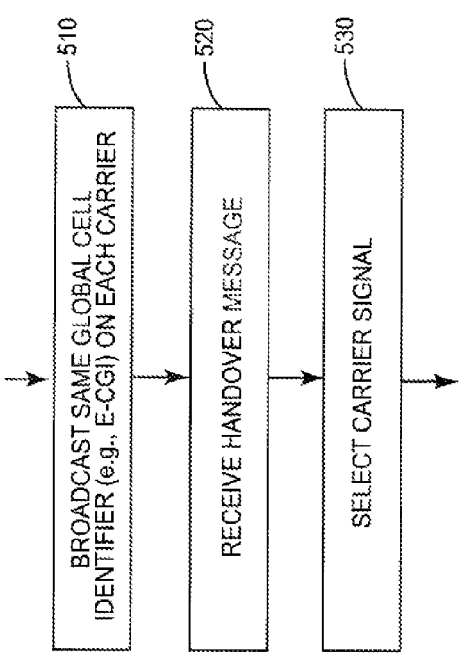
FIG. 5
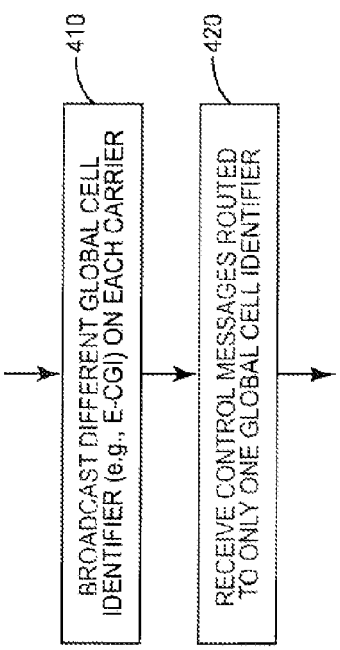
FIG. 6
FIG. 4

CARRIER AGGREGATION SUPPORT FOR HOME BASE STATIONS

RELATED APPLICATION

This application claims priority to U.S. Provisional Application Ser. No. 61/493,112, filed 3 Jun. 2011, the entire contents of which are incorporated by reference herein.

TECHNICAL FIELD

The present invention relates generally to base stations in wireless communication networks, and more particularly relates to techniques for communicating control messages to and from such base stations.

BACKGROUND

The usage of mobile broadband services using cellular networks has shown a significant increase in recent years. In parallel to this growth there has been an ongoing evolution of 3G and 4G cellular networks, such as the High-Speed Packet Access (HSPA) and Long-Term Evolution (LTE) networks developed by members of the 3rd-Generation Partnership Project (3GPP) and WiMAX networks developed by members of the WiMAX Forum. These network technologies continue to be developed and improved to support ever-increasing performance requirements with regards to capacity, peak bit rates and coverage.

Operators deploying these networks are faced with a number of challenges related to such things as site and transport costs and availability, a lack of wireless spectrum, and so on. Many different techniques are considered for meeting these challenges and providing cost-efficient mobile broadband services.

One option for increasing the capacity and peak rates in 3GPP cellular networks is carrier aggregation. The principle behind carrier aggregation techniques, sometimes referred to as "multi-carrier" technology, is that a given mobile terminal ("user equipment," or "UE," in 3GPP terminology) can be served by multiple distinct carrier signals, at different frequencies and even in different frequency bands, at the same time. Previously it has been possible for a UE to use only one carrier at a given time. Carrier aggregation increases the maximum bit rate available to a given UE, and can also improve network capacity due to better resource utilization. Carrier aggregation was introduced for LTE in Release 10 of the 3GPP standards and for HSPA in Release 8. In the initial release, carrier aggregation was limited to two adjacent downlink carriers.

One principle adopted for carrier aggregation in 3GPP is that the UE is assigned a primary component carrier on which it receives most of the control information. Transmission of user data, on the other hand, can be performed on both the primary component carrier and on one or more secondary component carriers.

In one mode of operation in LTE networks, carrier aggregation can operate such that the UE receives uplink and downlink scheduling commands only on the primary component. In other modes of operation in LTE networks, the UE receives scheduling commands on all component carriers. However, regardless of the mode of operation, the UE is only required to read the broadcast channel (in order to acquire system information parameters) on the primary component carrier. System information related to the secondary component carriers can be provided to the UE in dedicated RRC messages. (For details on carrier aggregation, see 3GPP TS 36.300, v. 10.3.0, April 2011, available at http://www.3gpp.org/ftp/Specs/html-info/36300.htm.)

From the point of view of a base station (a "NodeB" or "NB" in HSPA systems, or an "evolved NodeB" or "eNB" in LTE systems), each carrier is associated with its own cell. So, support for carrier aggregation means that the base station (which may be at a single site or split among several transmission points) supports multiple cells. In other words, the base station broadcasts multiple Cell IDs.

Another option available to the operator is the deployment of home base stations or other small base stations that complement the traditional macro cellular network. In LTE, home base stations are known as "HeNBs," while in HSPA systems these home base stations are called "HNBs". The Femto Forum (www.femtoforum.org) refers to these small, complementary base stations as "femtocells" or simply "femtos." Some of the benefits of these small base stations are lower site costs, due to smaller physical size and lower output power, as well as increased system capacity and coverage due to the closer deployments of base stations to the end user.

A network operator can configure cells as Open, Hybrid or Closed. Open cells are open to use for all subscribers, with no preference to perform cell reselection to individual cells. Closed cells broadcast a CSG (Closed Subscriber Group) cell type indicator and a CSG identifier. The broadcasted information elements (IEs) are called "CSG Indicator" and "CSD ID", the former indicating values of either "true" or "false" and the latter indicating a 27-bit identifier uniquely pointing at a CSG in the used Public Land Mobile Network (PLMN). Closed cells are only available for use by mobiles belonging to the identified CSG. When the cell is closed, the CSG Indication broadcasted has the value "true". Hybrid cells also broadcast a CSG (Closed Subscriber Group) identity, but in this case the CSG Indication broadcasted has the value "false". Hybrid cells are available for all users. In addition, users belonging to the CSG have a preference for selecting CSG cells with the same CSG identity.

The number of deployed home base stations could be very large. For that reason, and because they are considered to be less reliable nodes, solutions have been introduced for home base stations to connect to the core network via a home base station gateway. For LTE, this home base station gateway is referred to as HeNB GW; for HSPA, it is known as HNB GW. For the purposes of this document, the term H(e)NB GW will be used to refer to either.

The H(e)NB GW serves to hide the home base station from the rest of the network. In the LTE/SAE case, the HeNB GW is optional. As a result, the S1 interface is used by the HeNB to connect to either an HeNB or the core network (the evolved packet core, or EPC, in LTE), and the HeNB GW therefore has S1-interfaces on both sides of it. To the rest of the network, an HeNB GW looks like a large eNB with many cells. From an HeNB's point of view, a HeNB GW looks like a core network node (i.e, the Mobility Management Entity, or MME).

The LTE architecture for HeNBs is illustrated in FIG. 1. In the upper part of FIG. 1, it can be seen that the illustrated HeNB 110 sends and receives control information to and from EPC 130 via the S1-MME interface. In this case, the control information is relayed via the HeNB GW 120, which appears to HeNB 110 as an MME. HeNB 110 sends and receives user data over the S1-U interface; this is via the SeGW 140, which is another component of EPC 130. Still another component of the EPC 130 is the Home eNodeB Management System (HeMS), which facilitates operation and maintenance (OAM) of HeNBs.

In the lower part of FIG. 1, several HeNBs 110 are connected to MMEs in the EPC 130 via HeNB GW 120, which is considered part of the radio access network (RAN). However, another HeNB 110 is connected directly to the MME/S-GW functionalities 170 in EPC 130, in the same manner as conventional eNBs 160.

An HeNB 110 that is connected to the network via an HeNB GW 120 is connected to only one HeNB GW 120. In this configuration, the HeNB 110 does not support the network node selection (NAS Node Selection Function, or NNSF). Instead, the HeNB GW 120 supports the network node selection functionality, enabling support for MME-pools. In the case when the HeNB 110 connects directly to the EPC 130, the HeNB 110 supports the network node selection functionality.

In the HSPA/WCDMA case, an HNB GW is mandatory. A new Iuh interface is defined between HNBs and the HNB GW, and the normal Iu interface is used between the HNB GW and the core network. To the rest of the network, the HNB GW just looks like a large RNC with many service areas. (Service area is the UTRAN concept for one or multiple cells). The HNB only connects to one HNB GW, so the HNB does not have the network node selection functionality. Instead, the HNB GW supports the network node selection functionality enabling support for MSC and SGSN-pools.

According to the current standards, each logical H(e)NB only supports a single cell. In HSPA/WCDMA this is a specified restriction aimed at reduce HNB complexity. In LTE this is due to the use of all of the 28 bits of E-UTRAN Cell ID (E-CGI) for routing of S1 signaling towards the HeNBs. For normal eNBs the first 20 bits of the E-CGI correspond to the eNB ID used for message routing and the remaining 8 bits correspond to the Cell ID within that eNB. For HeNBs, the entire 28 bits of the E-CGI indicate a specific HeNB and are used for message routing.

SUMMARY

Since H(e)NBs only support one cell according to current standards, carrier aggregation in H(e)NBs is not supported by those standards. Previously proposed solutions to this problem for LTE HeNBs are based on the premise that the HeNB simultaneously supports multiple S1-connections to the EPC or to an HeNB GW, i.e., a separate S1-connection one for each cell or carrier. Similar solutions can be envisioned for UTRAN HNBs supporting multiple Iuh connections. However, this requires that H(e)NBs support multiple S1 connections (for HeNBs) and Iuh connections (for HNBs) in order to support carrier aggregation. Enabling multiple S1 or Iuh connections would increase the number of Stream Control Transmission Protocol (SCTP) connections to the core network nodes or to the H(e)NB GW, and it would increase the cost of the H(e)NB equipment due to higher number of SCTP sockets needed.

Several embodiments of the present invention enable support for carrier aggregation in H(e)NBs without increasing the number of S1 or Iuh connections, and thus without increasing the number of associated SCTP connections. This has the advantage of reducing the configuration burden and network load. Another benefit is that existing protocols are fully reused, without introducing proprietary protocols.

Several of the methods described herein are implemented in a home base station adapted to support carrier aggregation. In one example method, two carrier signals, on different frequencies, are transmitted from the home base station to one or more user devices that support multi-carrier operation. The home base station transmits different global cell identifiers corresponding to different cells or the same global cell identifier for all supported cells on the two carrier signals, and then sends and receives control messages for both of the two carrier signals over a single control-plane interface between the home base station and either a core network node or a home base station gateway. In some embodiments, the home base station is an HeNB configured for operation in an LTE network, in which case the control-plane interface comprises an S1 interface. In other embodiments, the home base station is an HNB configured for operation in a UTRAN network and the control-plane interface comprises an Iuh interface.

In several embodiments, the method described above further comprises supporting a single control-plane interface for signaling associated with user equipment and for signaling associated with non-user equipment, relative to all supported cells, between the home base station and a neighboring base station. In some of these embodiments, this single control-plane interface between the home base station and the neighboring base station comprises an X2 interface.

In some embodiments, the method further includes receiving, over the single control-plane interface between the home base station and the core network node or the home base station gateway, only control messages routed according to a first one of the global cell identifiers. In some of these embodiments, this includes receiving one or more handover request messages that indicate a physical cell identifier corresponding to a second one of the global cell identifiers.

In a variant of the above-described techniques, the method implemented by the home base station includes signaling, to the core network node, that the single control-plane interface between the home base station and the core network node or the home base station gateway corresponds to multiple global cell identifiers, and receiving, over the single control-plane interface between the home base station and the core network node or the home base station gateway, control messages corresponding to each of the two global cell identifiers. In some of these embodiments, the method further comprises establishing a single control-plane interface between the home base station and a neighboring base station, wherein said establishing comprises signaling to the neighboring base station that the single control-plane interface between the home base station and the neighboring base station corresponds to multiple global cell identifiers. Handover requests corresponding to each of the two global cell identifiers are then received, over the single control-plane interface between the home base station and the neighboring base station, handover request messages corresponding to each of the two global cell identifiers.

In another variant of the above-described techniques, the method implemented by the home base station further includes signaling to the core network node or the home base station gateway, during establishment of the single control-plane interface between the home base station and the core network node, that the home base station supports multiple cells corresponding to different global cell identifiers, where the global cell identifiers each comprise a first part, common to both of the global cell identifiers for the home base station, and a second part, unique for each carrier transmitted by the home base station. Control messages corresponding to each of the two global cell identifiers are then received over the single control-plane interface between the home base station and the core network node or the home base station gateway. In some of these embodiments, the method further comprises establishing a single control-plane interface between the home base station and a neighboring base station, wherein said establishing comprises signaling to the neighboring base station that the home base station supports multiple cells corresponding to different global cell identifiers.

In another example method that may be implemented in a home base station adapted to support carrier aggregation, two carrier signals, on different frequencies, are transmitted from the home base station to one or more user devices that support multi-carrier operation. The home base station also broadcasts, on the two carrier signals, a single global cell identifier corresponding to both of the two carrier signals, receives a handover request over a single control-plane interface between the home base station and a neighboring base station, and selects one of the carrier signals as the target carrier for the handover request, based on information about the source cell or based on an evaluation of interference, or both. In some of these embodiments, the method further comprises, during establishment of the single-control plane interface between the home base station and the neighboring base station, signaling to the neighboring base station that the single global cell identifier corresponds to multiple physical cell identifiers.

Other methods described in detail below may be implemented in wireless network nodes other than a home base station, such as a home base station gateway, a core network node, or a base station neighboring a home base station. In an example method, the node receives configuration information indicating that a single control-plane interface between the home base station and the wireless network node corresponds to two or more global cell identifiers for the home base station, and then routes control messages corresponding to the two or more global cell identifiers to the home base station via the single control-plane interface. In some of these embodiments, receiving the configuration information comprises receiving, from the home base station, interface setup information that lists the two or more global cell identifiers for the home base station. In others, receiving the configuration information comprises receiving, from the home base station, interface setup information for a second interface setup that indicates a relation between the second setup and the previously established single control-plane interface between the home base station and the wireless network node. In these and other embodiments, routing the control messages comprises sending a handover message to the home base station, via the single control-plane interface between the home base station and the wireless network node, the handover message identifying a physical cell identifier for one of two or more target carriers supported by the home base station.

Apparatus for carrying out the various processes disclosed herein are also described, including home base stations and other wireless network nodes that are configured to carry out the several methods summarized above. Of course, the present invention is not limited to the features and advantages summarized above. Indeed, those skilled in the art will recognize additional features and advantages of the present invention upon reading the following detailed description and viewing the attached drawings.

BRIEF DESCRIPTION OF THE DRAWINGS

FIG. 3 is a process flow diagram illustrating a method for supporting carrier aggregation at an H(e)NB.

FIGS. 4, 5, 6, and 7 illustrate details of several techniques for supporting carrier aggregation at an H(e)NB.

DETAILED DESCRIPTION

Figure 1:
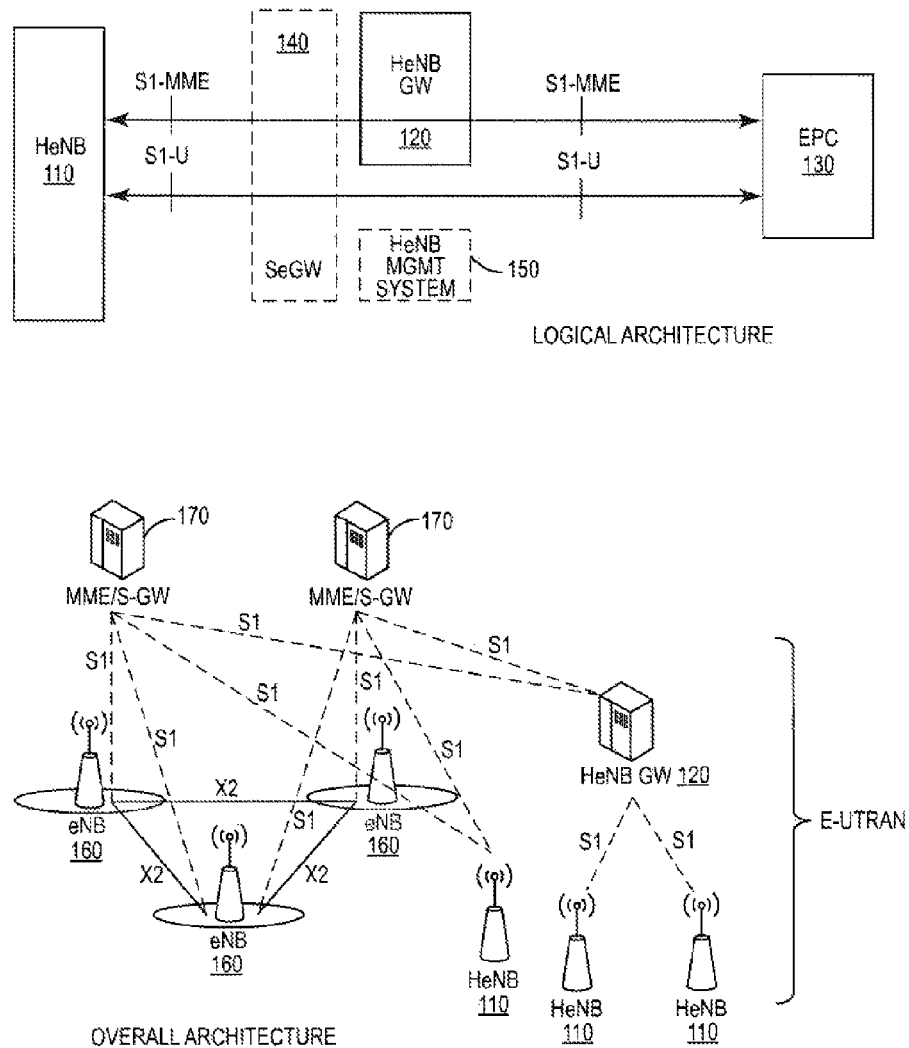
FIG. 1 illustrates the architecture of an LTE/SAE system that includes HeNBs.

Various embodiments of the present invention are now described with reference to the drawings, wherein like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

Note that although terminology from 3GPP's specifications for LTE and LTE-Advanced is used throughout this disclosure to exemplify the invention, this should not be seen as limiting the scope of the invention to only these systems. Other wireless systems including or adapted to include home base stations configured to support multi-carrier transmission techniques may also benefit from exploiting the ideas covered within this disclosure.

Since H(e)NBs only support one cell according to current standards, carrier aggregation in H(e)NBs is not supported by those standards. In LTE, as explained above, this limitation is due to the use of the entire 28-bit E-CGI to uniquely identify an HeNB and to route messages to it. Although UTRAN HNBs do not use HNB IDs to allow routing of procedural messages, current standardization imposes that HNBs can support only one cell.

In 3GPP standardization meetings, some solutions have been proposed for how an LTE HeNB can support carrier aggregation and multiple cells with only minor changes to the standard. The proposed solutions are based on the premise that the HeNB simultaneously supports multiple S1-connections to the EPC or to an HeNB GW, i.e., a separate S1-connection one for each cell or carrier. Similar solutions can be envisioned for UTRAN HNBs supporting multiple Iuh connections.

One problem with these solutions is the requirement that H(e)NBs support multiple S1 connections (for HeNBs) and Iuh connections (for HNBs) in order to support carrier aggregation. This can be seen as a burden, since each S1 or Iuh connection is associated with one or more Stream Control Transmission Protocol (SCTP) connections. Enabling multiple S1 or Iuh connections would increase the number of SCTP connections to the core network nodes (e.g., to the MME in LTE) or to the H(e)NB GW, and it would increase the cost of the H(e)NB equipment due to higher number of SCTP sockets needed.

Another issue arising from solutions previously presented to 3GPP is that an H(e)NB that supports carrier aggregation would consist of two or more logical H(e)NBs. In order to allow proper scheduling of data between the two different logical H(e)NBs, a proprietary interface between the Layer2 levels of each logical H(e)NB would be required.

To address these issues, several embodiments of the present invention enable support for carrier aggregation in H(e)NBs without increasing the number of S1 or Iuh connections, and thus without increasing the number of associated SCTP connections. This has the advantage of reducing the configuration burden and network load. Another benefit is that existing protocols are fully reused, without introducing proprietary protocols.

There are several related variations of these inventive techniques, as detailed below. Again, however, it should be noted that while E-UTRAN terminology is used in the following discussion, the solutions and techniques disclosed are also applicable to other access technologies, such as UTRAN.

Solution A:

In a first approach, the HeNB node is divided into two or more logical HeNBs so that it supports two (or more) cells, each having a different ECGI and different HeNB ID, and corresponding to a distinct carrier. Each E-CGI will be broadcast on a different carrier, but message routing will only be performed for one of the E-CGIs.

The HeNB in this case will set up only one S1 and X2 interface to a given HeNB GW or MME, reporting only one E-CGI and consequently only one HeNB ID. The reported cell will be the one taken into consideration for S1 and X2 procedures such as mobility. Neighboring RAN nodes which want to handover a UE to the HeNB will be configured with information about which E-CGI should be used for handover routing. This information can be acquired either from OAM (Operations and Maintenance) if the neighbor relations are configured centrally, or as part of an automatic neighbor relation procedure, where a newly discovered neighbor relation that includes E-CGI may need to be verified via OAM before X2 address lookup is initiated.

A variant of this approach is to enhance the handover request messages (S1 Handover Required and X2 Handover Request messages) to include also the Physical Cell Identifier (PCI) information of the target cell, so that the HeNB can understand to which of its cells the handover is targeted. In this case, the PCI overrides the E-CGI.

Optionally, the HeNB can be configured to instruct UEs to use cell prioritization and to always report the "primary" E-CGI in cases of mobility to the HeNB. This will prevent reporting of the secondary E-CGI.

Figure 2:
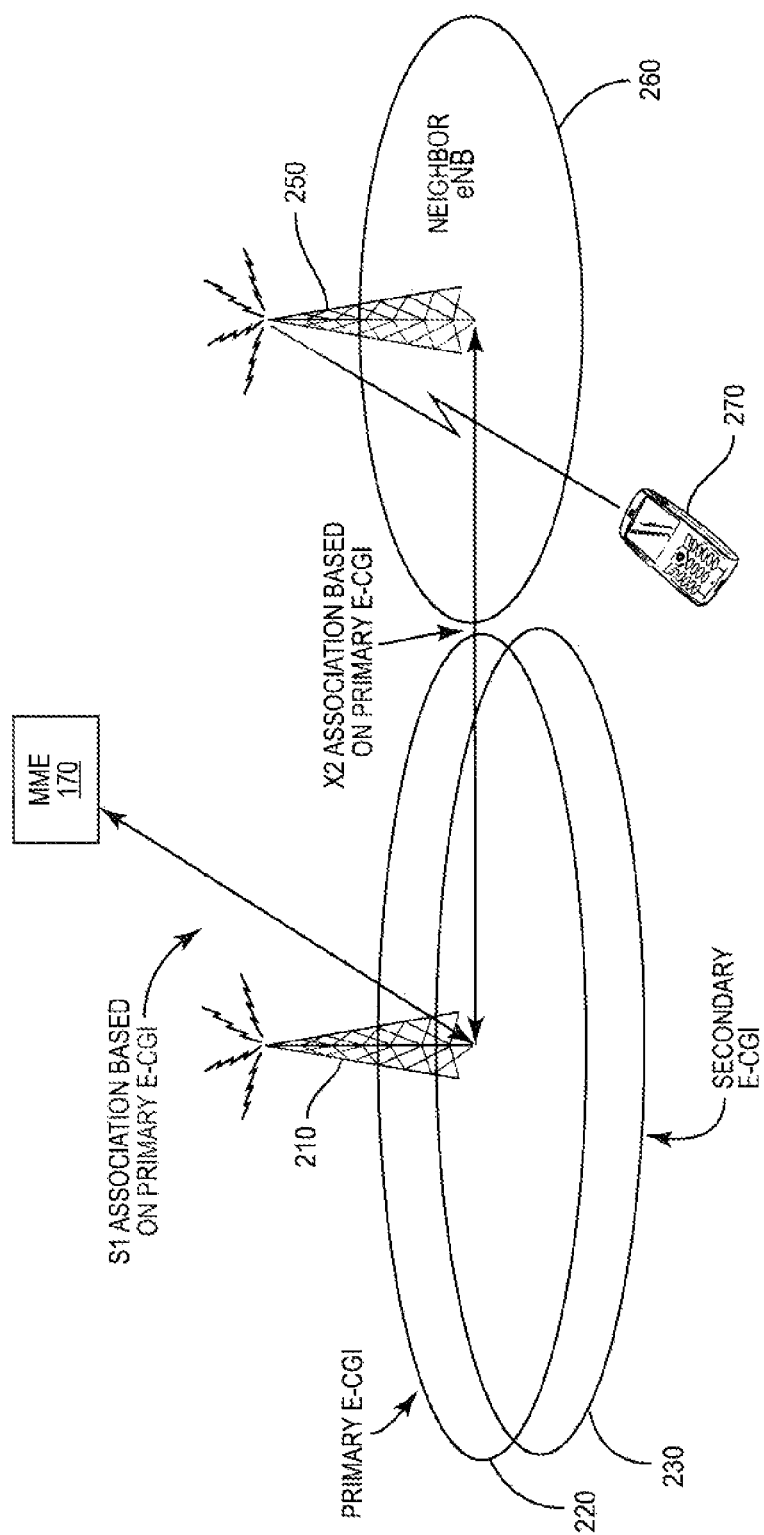
FIG. 2 illustrates an HeNB supporting two carriers corresponding to different E-CGIs.

FIG. 2 illustrates aspects of this approach for two-carrier carrier aggregation. In FIG. 2, HeNB 210 transmits on two carriers, corresponding to cells 220 and 230. Cell 220 has a primary E-CGI, while cell 230 has a differing secondary E-CGI; these E-CGIs are broadcast on their respective carriers. Neighbor eNB 250 supports cell 260. Here, the associations between the HeNB 210 and the MME 170, as well as between the HeNB 210 and neighbor eNB 250, are based on the primary E-CGI. From the perspective of UE 270, the primary E-CGI cell 220 is prioritized with respect to the secondary E-CGI cell 230.

Solution B:

In a second approach, an HeNB supporting carrier aggregation adopts the same E-CGI addressing scheme used by normal eNBs, i.e., it uses a common eNB ID of 20 bits, but different cell IDs for each cell or carrier. In order for this to be possible, however, a new indication information element (IE) is defined for use over S1 and X2. This new IE would be used to perform a S1 or X2 setup, highlighting that the triggering node is an HeNB supporting carrier aggregation, i.e., an HeNB supporting multiple cells.

Neighboring RAN nodes are configured to know that although the target cell (which handover of a UE should be performed to) is reported as an HeNB, the addressing scheme for normal eNBs should be used. This means that the RAN node should use the target cell ID in the form of a 20-bit eNB ID and an 8-bit cell ID when communicating over S1 or X2.

For example, the X2 SETUP message, which is sent by an eNB to a neighboring eNB to transfer initialization information for a TNL association, can be modified according to this approach, where an additional new information element (IE) is added. In this example, the new IE can be called the "HeNB Indicator." When the HeNB Indicator is set to "true," the Global eNB ID is set to 20 bits. The same concept can be applied to the S1 SETUP message, which is used to initialize HeNB to MME or HeNB to HeNB GW communications. An HeNB Indicator in the S1 SETUP alerts the MME or HeNB GW that the addressing scheme normally used for conventional eNBs should be used.

Solution C:

In a third approach, the HeNB is configured to broadcast a different E-CGI on each carrier and message routing is performed for both of these E-CGIs. However, in this case the S1/X2 setup signaling is modified, so that it is possible for the HeNB to report to the MME or other RAN nodes a list of all E-CGI that the HeNB supports. This makes it possible to only support a single S1/X2 connection for two or more cells or carriers. The Global eNB ID reported in the S1/X2 SETUP REQUEST/RESPONSE messages will be associated with one of the supported ECGIs. However, routing towards the HeNB can occur via eNB IDs corresponding to any of the supported ECGIs. Through this modified setup, the RAN and MME nodes communicating with the HeNB are made aware that multiple E-CGI can be reached via the same S1 or X2 connection.

A variation of this approach is to introduce a relation indication in S1 setup, to indicate the relation to an existing S1, for example identified by E-CGI used for the first S1 connection. With this variant technique, a separate setup process or an update of an existing S1 connection (e.g., via eNB CONFIGURATION UPDATE message) will be carried out for a second E-CGI supported by the HeNB. However, the later setup process will include a reference to the first S1 setup, so that the RAN and MME nodes communicating with the HeNB are again aware that multiple E-CGI can be reached via the same S1 or X2. Alternatively, if the procedure used is an update of the existing S1 connection, the eNB CONFIGURATION UPDATE will include a reference to the first S1 setup, so that the RAN and MME nodes communicating with the HeNB are again aware that multiple E-CGI can be reached via the same S1 or X2.

Solution D:

In another approach, the HeNB is configured to use only one of the two or more carriers supported by the HeNB as a Primary Component Carrier. The E-CGI associated with this carrier is used for routing (associated with the S1 and X2 setup). The other carriers will be barred, or no system information will be broadcasted. UEs will not be able to camp on the other carriers and no incoming handovers will be triggered to these carriers. The neighboring RAN nodes will be configured to only trigger handover to the carrier used as a primary component carrier.

An alternative is to allow a list of E-CGIs in an S1 setup message. One of the E-CGIs in this list could be labeled as the primary E-CGI, for example associated to the carrier that is the primary component carrier. The remaining cell(s) could be labeled as secondary carrier(s). The UE will always select the primary carrier cell, while it will be assigned the secondary carrier by the serving HeNB according to standardized Carrier Aggregation procedures.

Solution E:

With this approach, the HeNB is configured to broadcast the same E-CGI on both carriers. Different PCIs may be, but are not necessarily, used. The single E-CGI is used for message routing and is associated to the S1/X2 connection of the HeNB.

In addition to broadcasting the same E-CGI in all cells or carriers, the HeNB also has the functionality at incoming handover to decide on which carrier the UE should be assigned as a primary component carrier. In this case, it is no longer possible that this information is decided by the source system. The HeNB functionality to decide which target carrier/cell should be used can be based on information about the source cell (e.g., it might be beneficial to select a carrier with the same frequency as the source cell), or based on interference mitigation targets, e.g., the target carrier could be the one that at that point in time minimizes interference (evaluated via UE measurements and HeNB measurements when in scanning mode), or both The neighbor eNBs are configured to know that the same E-CGI is used for two different frequencies, even if different PCIs are used. This is to avoid possible error reports during Automatic Neighbour Relation (ANR) and inclusion of PCI-E-CGI in neighbor cell list. During X2 SETUP, it is possible to report the same E-CGI with different PCIs in the Served Cell Information IE and in the Neighbour Information IE. The node receiving such instances of these two IEs will be configured to understand that the E-CGI with two different assigned PCIs belongs to a HeNB supporting multiple cells.

Although discussed here in the context of H(e)NB functionality, the general concepts and techniques discussed herein have broader applicability. Thus, base stations other than HeNBs can be configured to support aggregated S1 connections, i.e., with mechanisms to let one S1 connection represent multiple base stations. Likewise, while the techniques disclosed herein are applied specifically to 3GPP LTE systems, the techniques can be applied to other systems, using other radio access technologies, as well.

Various embodiments of the solutions described above enable the use of carrier aggregation with H(e)NBs, enabling increased performance (bitrates, spectrum utilization) without introducing unnecessary overhead (e.g., additional signaling connections). Those skilled in the art will appreciate that specific embodiments of the techniques above include systems comprising one or more H(e)NBs, and/or one or more H(e)NB GWs, and/or one or more neighbor (e)NBs, where these systems are configured to carry out one or some combination of the techniques described above. Some embodiments may also include a core network node, such as an MME or RNC. Other embodiments include methods, suitable for implementation by one or more of the network nodes discussed above, for carrying out one or more of these techniques.

Process flow diagrams corresponding to several variants of these methods are provided in FIGS. 3 to 7. FIG. 3, for example, illustrates a general process applying to all of the solutions described above, as might be implemented in a H(e)NB. As shown at block 310, two or more carrier signals are transmitted from the home base station, using different frequencies. As indicated at block 320, however, the home base station supports only a single control-plane interface between the home base station and either a core network node (e.g, an MME) or a home base station gateway. This means that the home base station receives control messages for all of the carrier signals over the single control-plane interface.

FIG. 4 illustrates additional details to the process of FIG. 3, and is relevant to several of the solutions described above. As shown at block 410, the home base station broadcasts different global cell identifiers, such as E-CGIs in the LTE context, on each carrier. However, control messages sent to the home base station over the single control-plane interface are routed to the home base station using only one of those global cell identifiers.

A variant approach is shown in FIG. 5. In this approach, the same global cell identifier (e.g., E-CGI) is broadcast on two or more carrier signals transmitted from the home base station, as shown at block 510. In this case, a handover message received from the core network or from a neighboring base station, as shown at block 520, is routed to the home base station using that single global cell identifier. With this approach, the home base station selects one of the carrier signals, as shown at block 530, based on other information, such as information about the source cell for the handover, or based on an evaluation of interference, or both. Thus, the home base station is responsible for selecting which of the two (or more) carrier signals should receive the handover.

In several of the solutions described earlier, other network nodes need to be aware that the home base station supports multi-carrier operation even though it is a home base station, not a conventional base station. This is shown in FIG. 6. As shown at block 610, the home base station signals another network node, such as a core network node, a home base station gateway, or a neighboring base station, that the home base station supports multiple carriers. The network nodes that have been informed in this manner now know that they should use a 20-bit base station identifier for routing messages to the home base station, rather than the full 28-bit E-CGI that they would normally use. Thus, the home base station receives control messages for both of the carrier signals, routed to the home base station according to a common 20-bit part of the two E-CGIs that are broadcast on the carriers, as shown at block 620. More generally, with this approach the two (or more) global cell identifiers corresponding to multiple carriers transmitted from the home base station include a first part, common to all of the global cell identifiers for the home base station, and a second part, unique for each carrier. Control messages are routed to the home base station using that first part.

Figure 7:
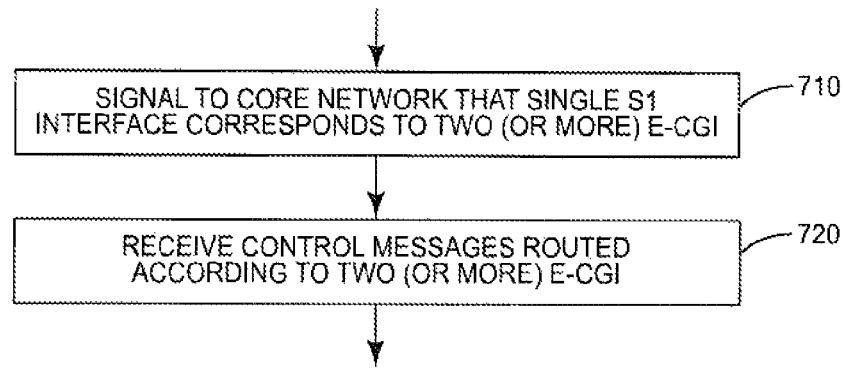

Still another variant is illustrated in FIG. 7. As was the case in the process of FIG. 6, the home base station signals to the core network (or to a home base station gateway or to a neighboring node) that a single control-plane interface corresponds to two or more global cell identifiers, as shown at block 710. The other network node then knows to associate both global cell identifiers with the single control-plane interface. Thus, the home base station receives control messages routed according to two or more global cell identifiers, over a single control-plane interface.

Still further embodiments of the present invention include network nodes, such as a H(e)NB or H(e)NB GW, configured to carry out one or more of the techniques described above. These latter embodiments include conventional network interface circuits, radio hardware, and the like, with processing/control circuits that are modified to carry out one or several of the techniques described above. An example configuration for an H(e)NB is shown in the block diagram of FIG. 8, which illustrates a few of the components relevant to the present techniques, as realized in an H(e)NB.

The pictured apparatus includes radio circuit 810 and baseband & control processing circuit 820. Radio circuit 810 includes receiver circuits and transmitter circuits that use known radio processing and signal processing components and techniques, typically according to a particular telecommunications standard such as the 3GPP standard for LTE and/or LTE-Advanced. In the present case, these receiver circuits and transmitter circuits are adapted to support multi-carrier transmission, using two or more carriers. The illustrated apparatus also includes an S1 interface circuit 850, configured to communicate with an H(e)NB GW and/or one or more core network nodes as well as an X2 interface circuit 880, configured to communicate with neighboring base stations. In both cases these interface circuits are configured to communicate according to conventional communications standards, such as those specified by 3GPP, although the messages sent over these interfaces may be modified according to the various techniques described earlier. Because the various details and engineering tradeoffs associated with the design and implementation of radio circuit 810, S1 interface 870, and X2 interface 880 are well known and are unnecessary to a full understanding of the invention, additional details are not shown here.

Baseband & control processing circuit 820 includes one or more microprocessors or microcontrollers 830, as well as other digital hardware 835, which may include digital signal processors (DSPs), special-purpose digital logic, and the like. Either or both of microprocessor(s) 830 and digital hardware may be configured to execute program code 842 stored in memory 840, along with radio parameters 844. Again, because the various details and engineering tradeoffs associated with the design of baseband processing circuitry for mobile devices and wireless base stations are well known and are unnecessary to a full understanding of the invention, additional details are not shown here The program code 842 stored in memory circuit 840, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters 844 include various pre-determined configuration parameters as well as parameters determined from system measurements, such as channel measurements, and may include parameters relating component carriers in a carrier configuration to cell IDs.

Figure 8:
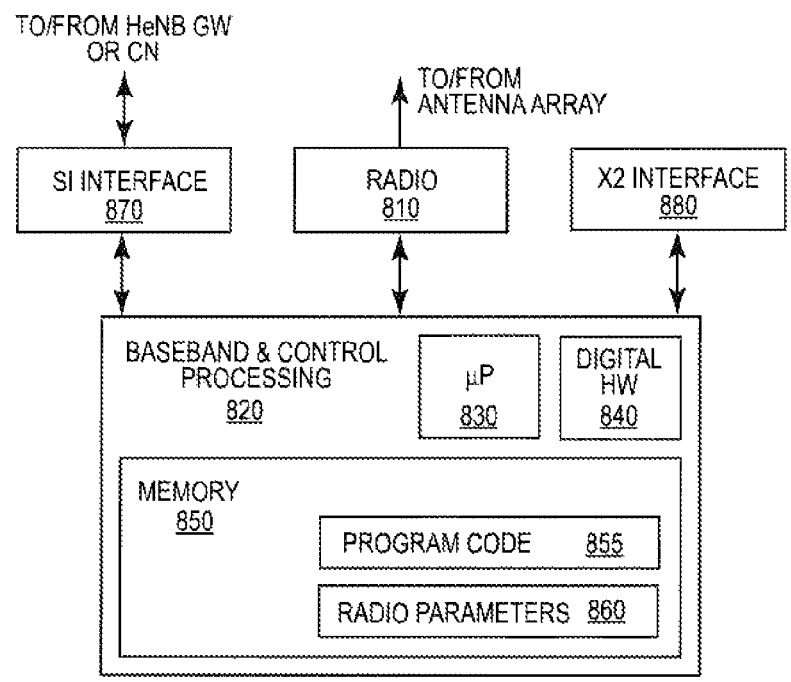
FIG. 8 is a block diagram illustrating features of an example wireless transceiver.

Accordingly, in various embodiments of the invention, processing circuits, such as the baseband & control processing circuits 820 of FIG. 8, are configured to carry out one or more of the techniques described above for supporting carrier aggregation in home base stations. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Finally, those skilled in the art will appreciate that a similar configuration can apply to an H(e)NB GW, except that the radio circuitry 810 is then omitted and the S1 interface circuit 850 is configured to support connections to the core network as well as to one or more H(e)NBs. Furthermore, while the several solutions disclosed above are described as separate solutions, those skilled in the art will appreciate that some features of the several solutions may be readily adapted to others of the described solutions.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method, in a home base station, for supporting carrier aggregation, the method comprising:
   transmitting, from the home base station, two carrier signals on different frequencies to one or more user devices that support multi-carrier operation;
   broadcasting, from the home base station, different global cell identifiers corresponding to different cells or the same global cell identifier for all supported cells on the two carrier signals; and
   sending and receiving control messages for both of the two carrier signals over a single control-plane interface between the home base station and either a core network node or a home base station gateway, without increasing a number of connections in the single control-plane interface.

2. The method of claim 1, wherein the home base station comprises an HeNB configured for operation in an LTE network and wherein the control-plane interface comprises an S1 interface.

3. The method of claim 1, wherein the home base station comprises an HNB configured for operation in a UTRAN network and wherein the control-plane interface comprises an Iuh interface.

4. The method of claim 1, further comprising supporting a single control-plane interface for signaling associated with user equipment and for signaling associated with non-user equipment, relative to all supported cells, between the home base station and a neighboring base station.

5. The method of claim 4, wherein the single control-plane interface between the home base station and the neighboring base station comprises an X2 interface.

6. The method of claim 1, further comprising receiving, over the single control-plane interface between the home base station and the core network node or the home base station gateway, only control messages routed according to a first one of the global cell identifiers.

7. The method of claim 6, wherein said receiving comprises receiving one or more handover request messages that indicate a physical cell identifier corresponding to a second one of the global cell identifiers.

8. The method of claim 1, further comprising:
   signaling, to the core network node, that the single control-plane interface between the home base station and the core network node or the home base station gateway corresponds to multiple global cell identifiers; and
   receiving, over the single control-plane interface between the home base station and the core network node or the home base station gateway, control messages corresponding to each of the two global cell identifiers.

9. The method of claim 8 further comprising:
   establishing a single control-plane interface between the home base station and a neighboring base station, wherein said establishing comprises signaling to the neighboring base station that the single control-plane interface between the home base station and the neighboring base station corresponds to multiple global cell identifiers; and
   receiving, over the single control-plane interface between the home base station and the neighboring base station, handover request messages corresponding to each of the two global cell identifiers.

10. The method of claim 1, wherein the global cell identifiers each comprise a first part, common to both of the global cell identifiers for the home base station, and a second part, unique for each carrier transmitted by the home base station, the method further comprising:

signaling to the core network node or the home base station gateway, during establishment of the single control-plane interface between the home base station and the core network node, that the home base station supports multiple cells corresponding to different global cell identifiers; and receiving, over the single control-plane interface between the home base station and the core network node or the home base station gateway, control messages corresponding to each of the two global cell identifiers.

11. The method of claim 10, further comprising:
establishing a single control-plane interface between the home base station and a neighboring base station, wherein said establishing comprises signaling to the neighboring base station that the home base station supports multiple cells corresponding to different global cell identifiers; and receiving, over the single control-plane interface between the home base station and the neighboring base station, handover request messages corresponding to each of the two global cell identifiers.

12. A method, in a wireless network node, for routing handover messages to a home base station, characterized in that the method comprises:
receiving configuration information indicating that a single control-plane interface between the home base station and the wireless network node corresponds to two or more global cell identifiers for the home base station; and routing control messages corresponding to the two or more global cell identifiers to the home base station via the single control-plane interface, without increasing a number of connections in the single control-plane interface.

13. The method of claim 12, wherein the wireless network node is a core network node or a home base station gateway.

14. The method of claim 12, wherein the wireless network node is a base station neighboring the home base station.

15. The method of claim 12, wherein receiving said configuration information comprises receiving, from the home base station, interface setup information that lists the two or more global cell identifiers for the home base station.

16. The method of claim 12, wherein receiving said configuration information comprises receiving, from the home base station, interface setup information for a second interface setup that indicates a relation between the second setup and the previously established single control-plane interface between the home base station and the wireless network node.

17. The method of claim 12, wherein routing said control messages comprises sending a handover message to the home base station, via the single control-plane interface between the home base station and the wireless network node, the handover message identifying a physical cell identifier for one of two or more target carriers supported by the home base station.

18. A home base station configured to supporting carrier aggregation, comprising a radio unit, a control signaling interface unit, and one or more processing circuits, wherein the home base station is adapted to transmit two carrier signals on different frequencies to one or more user devices that support multi-carrier operation, and wherein the one or more processing circuits are further configured to:
broadcast, via the radio unit, different global cell identifiers corresponding to different cells or the same global cell identifier for all supported cells on the two carrier signals; and send and receive control messages for both of the two carrier signals over a single control-plane interface between the home base station and either a core network node or a home base station gateway, without increasing a number of connections in the single control-plane interface.

19. The home base station of claim 18, wherein the home base station comprises an HeNB configured for operation in an LTE network and wherein the control-plane interface comprises an S1 interface.

20. The home base station of claim 18, wherein the home base station comprises an HNB configured for operation in a UTRAN network and wherein the control-plane interface comprises an Iuh interface.

21. The home base station of claim 18, wherein the processing circuits are further configured to support a single control-plane interface for signaling associated with user equipment and for signaling associated with non-user equipment, relative to all supported cells, between the home base station and a neighboring base station.

22. The home base station of claim 21, wherein the single control-plane interface between the home base station and the neighboring base station comprises an X2 interface.

23. The home base station of claim 18, wherein the processing circuits are further configured to receive, over the single control-plane interface between the home base station and the core network node or the home base station gateway, only control messages routed according to a first one of the global cell identifiers.

24. The home base station of claim 23, wherein the processing circuits are configured to receive one or more handover request messages that indicate a physical cell identifier corresponding to a second one of the global cell identifiers.

25. The home base station of claim 18, wherein the processing circuits are further configured to:
signal, to the core network node, that the single control-plane interface between the home base station and the core network node or the home base station gateway corresponds to multiple global cell identifiers; and receive, over the single control-plane interface between the home base station and the core network node or the home base station gateway, control messages corresponding to each of the two global cell identifiers.

26. The home base station of claim 25, wherein the processing circuits are further configured to:
establish a single control-plane interface between the home base station and a neighboring base station, wherein said establishing comprises signaling to the neighboring base station that the single control-plane interface between the home base station and the neighboring base station corresponds to multiple global cell identifiers; and receive, over the single control-plane interface between the home base station and the neighboring base station, handover request messages corresponding to each of the two global cell identifiers.

27. The home base station of claim 18, wherein the global cell identifiers each comprise a first part, common to both of the global cell identifiers for the home base station, and a second part, unique for each carrier transmitted by the home base station, and wherein the processing circuits are further configured to:
signal to the core network node or the home base station gateway, during establishment of the single control-plane interface between the home base station and the core network node, that the home base station supports multiple cells corresponding to different global cell identifiers; and receive, over the single control-plane interface between the home base station and the core network node or the home base station gateway, control messages corresponding to each of the two global cell identifiers.

28. The home base station of claim 27, wherein the processing circuits are further configured to:

establish a single control-plane interface between the home base station and a neighboring base station, wherein said establishing comprises signaling to the neighboring base station that the home base station supports multiple cells corresponding to different global cell identifiers; and receive, over the single control-plane interface between the home base station and the neighboring base station, handover request messages corresponding to each of the two global cell identifiers.

29. A wireless network node adapted to route handover messages to a home base station, the wireless network node comprising one or more processing circuits configured to:

receive configuration information indicating that a single control-plane interface between the home base station and the wireless network node corresponds to two or more global cell identifiers for the home base station; and route control messages corresponding to the two or more global cell identifiers to the home base station via the single control-plane interface, without increasing a number of connections in the single control-plane interface.

30. The wireless network node of claim 29, wherein the wireless network node is a core network node or a home base station gateway.

31. The wireless network node of claim 29, wherein the wireless network node is a base station neighboring the home base station.

32. The wireless network node of claim 29, wherein the one or more processing circuits are configured to receive, from the home base station, interface setup information that lists the two or more global cell identifiers for the home base station.

33. The wireless network node of claim 29, wherein the one or more processing circuits are configured to receive, from the home base station, interface setup information for a second interface setup that indicates a relation between the second setup and the previously established single control-plane interface between the home base station and the wireless network node.

34. The wireless network node of claim 29, wherein the one or more processing circuits are configured to route said control messages by sending a handover message to the home base station, via the single control-plane interface between the home base station and the wireless network node, the handover message identifying a physical cell identifier for one of two or more target carriers supported by the home base station.

* * * * *